United States Patent
Mehran et al.

(10) Patent No.: US 12,273,168 B2
(45) Date of Patent: Apr. 8, 2025

(54) WIRELESS TELECOMMUNICATIONS NETWORK

(71) Applicant: BRITISH TELECOMMUNICATIONS PUBLIC LIMITED COMPANY, London (GB)

(72) Inventors: Farhad Mehran, London (GB); Richard Mackenzie, London (GB)

(73) Assignee: British Telecommunications Public Limited Company (GB)

( * ) Notice: Subject to any disclaimer, the term of this patent is extended or adjusted under 35 U.S.C. 154(b) by 156 days.

(21) Appl. No.: 17/760,217

(22) PCT Filed: Dec. 10, 2020

(86) PCT No.: PCT/EP2020/085463
§ 371 (c)(1),
(2) Date: Aug. 5, 2022

(87) PCT Pub. No.: WO2021/155980
PCT Pub. Date: Aug. 12, 2021

(65) Prior Publication Data
US 2023/0051491 A1    Feb. 16, 2023

(30) Foreign Application Priority Data

Feb. 5, 2020 (EP) .................................... 20155636
Feb. 5, 2020 (GB) .................................... 2001529

(51) Int. Cl.
*H04B 7/06* (2006.01)
*H04B 7/024* (2017.01)

(52) U.S. Cl.
CPC .......... *H04B 7/0617* (2013.01); *H04B 7/024* (2013.01); *H04B 7/0623* (2013.01)

(58) Field of Classification Search
CPC .... H04B 7/0617; H04B 7/024; H04B 7/0623; H04W 52/367; H04W 52/245
See application file for complete search history.

(56) References Cited

U.S. PATENT DOCUMENTS

| | | | |
|---|---|---|---|
| 8,767,572 B1 | 7/2014 | Vargantwar et al. | |
| 9,590,744 B2 | 3/2017 | Calin et al. | |
| (Continued) | | | |

FOREIGN PATENT DOCUMENTS

| | | |
|---|---|---|
| CN | 108495360 A | 9/2018 |
| CN | 108713347 A | 10/2018 |
| (Continued) | | |

OTHER PUBLICATIONS

Chen W., et al., "Single-Image Depth Perception in the Wild," University of Michigan, 30th Conference on Neural information Processing Systems, 2016, 14 pages.
(Continued)

*Primary Examiner* — Fred A Casca
(74) *Attorney, Agent, or Firm* — EIP US LLP

(57) ABSTRACT

This disclosure provides a method of operating a network node in a wireless telecommunications network, wherein the wireless telecommunications network includes a first access point having a transmitter configured to transmit in a first coverage area, including receiving, from a sensor, data indicating a location of an object within the first coverage area of the first access point's transmitter; determining, from a set of access rights including excluded, differentiated restrictions and no restrictions, that the object has the differentiated restrictions access right; responsive to the determination that the object has the differentiated restrictions access right, classifying, from a set of classes including a first class and a second class, the object in the first class, wherein the first class is associated with a first restriction configuration having a first electro and/or magnetic field (Continued)

exposure threshold and the second class is associated with a second restriction configuration having a second electro and/or magnetic field exposure threshold; responsive to the determination that the object is classified in the first class, determining that the object shall use the first electro and/or magnetic field exposure threshold; determining that a value of electro and/or magnetic field exposure for the object exceeds the first electro and/or magnetic field exposure threshold; and causing an adjustment of the first access point so as to reduce the value of electro and/or magnetic field exposure for the object.

12 Claims, 14 Drawing Sheets

(56) References Cited

U.S. PATENT DOCUMENTS

| | | | |
|---|---|---|---|
| 9,811,915 | B2 | 11/2017 | Stephenne et al. |
| 9,998,966 | B2 | 6/2018 | Morita et al. |
| 10,044,926 | B2 | 8/2018 | Galor et al. |
| 10,165,426 | B1 | 12/2018 | Jiang et al. |
| 11,039,388 | B2 | 6/2021 | Shojaeifard et al. |
| 11,206,290 | B2* | 12/2021 | Nambi ................ H04L 67/12 |
| 2003/0202662 | A1 | 10/2003 | McBrearty et al. |
| 2013/0200250 | A1* | 8/2013 | Daghighian ........... H04B 15/00 250/206 |
| 2013/0227449 | A1* | 8/2013 | Brown ................ G06F 16/904 715/764 |
| 2014/0329485 | A1 | 11/2014 | Calin et al. |
| 2015/0138992 | A1 | 5/2015 | Jover |
| 2017/0064562 | A1 | 3/2017 | Jacobson et al. |
| 2018/0138958 | A1 | 5/2018 | Asplund et al. |
| 2018/0160377 | A1* | 6/2018 | Abramsky .......... H04W 52/283 |
| 2018/0270783 | A1 | 9/2018 | Venkatraman et al. |
| 2018/0292844 | A1 | 10/2018 | Kosseifi et al. |
| 2018/0376275 | A1 | 12/2018 | Jiang et al. |
| 2019/0132804 | A1 | 5/2019 | Hong et al. |
| 2019/0334729 | A1* | 10/2019 | Woxland ............... H04L 9/3271 |
| 2020/0077257 | A1 | 3/2020 | Ekambaram et al. |
| 2020/0304916 | A1* | 9/2020 | Asfaw .................... H04S 7/303 |

FOREIGN PATENT DOCUMENTS

| | | |
|---|---|---|
| CN | 109792685 A | 5/2019 |
| CN | 110650479 A | 1/2020 |
| CN | 110996254 A | 4/2020 |
| CN | 109151938 B | 11/2020 |
| EP | 2090036 A1 | 8/2009 |
| EP | 2814292 A1 | 12/2014 |
| EP | 2833558 B1 | 12/2015 |
| EP | 3373466 A1 | 9/2018 |
| EP | 3518587 A1 | 7/2019 |
| EP | 3739781 A1 | 11/2020 |
| EP | 3764564 A1 | 1/2021 |
| GB | 2554544 A | 4/2018 |
| GB | 2559556 A | 8/2018 |
| GB | 2559731 A | 8/2018 |
| GB | 2591762 B | 9/2022 |
| JP | 2013120086 A | 6/2013 |
| JP | 2016032133 A | 3/2016 |
| JP | 2018148297 A | 9/2018 |
| KR | 20160012952 A | 2/2016 |
| WO | WO-2008061810 A1 | 5/2008 |
| WO | WO-2014014776 A1 | 1/2014 |
| WO | WO-2017052923 A1 | 3/2017 |
| WO | WO-2017198293 A1 | 11/2017 |
| WO | WO-2018134629 A1 | 7/2018 |
| WO | WO-2019040077 A1 | 2/2019 |
| WO | WO-2020065384 A1 | 4/2020 |

OTHER PUBLICATIONS

Chiarabiglio L., et al., "Planning 5G Networks Under EMF Constraints," State of the Art and Vision, IEEE Access, Aug. 8, 2018, 17 pages.
Combined search and Examination Report for Great Britain Application No. 2001528.5, mailed on Jun. 24, 2020, 7 pages.
Combined search and Examination Report for Great Britain Application No. 2001529.3, mailed on Jun. 24, 2020, 7 pages.
Combined search and Examination Report for Great Britain Application No. 2008677.3, mailed on Nov. 18, 2020, 5 pages.
Combined Search and Examination Report under Sections 17 and 18(3) for Great Britain Application No. 2018792.8, mailed on Apr. 26, 2021, 8 pages.
Combined Search and Examination Report under Sections 17 and 18(3) for Great Britain Application No. 2111494.7, mailed on Jan. 31, 2022, 9 pages.
Combined Search and Examination Report under Sections 17 and 18(3) for Great Britain Application No. 2114573.5, mailed on Nov. 26, 2021, 4 pages.
Droogenbroeck M.V., et al., "Vibe: A Universal Background Subtraction Algorithm for Video Sequences," IEEE, Research Gate, Jul. 2011, 18 pages.
European Search Report, Application No. 19188772.8, dated Jan. 17, 2020, 5 pages.
European Search Report, Application No. 19188773.6, dated Jan. 7, 2020, 11 pages.
European Search Report, Application No. 20155636.2, dated Apr. 22, 2020, 10 pages.
European Search Report, Application No. 20155637.0, dated Apr. 28, 2020, 10 pages.
Extended European Search Report for Application No. EP20179462.5, mailed on Jun. 24, 2020, 6 pages.
Garg R., "Learning to Predict Depth on the Pixel 3 Phones," Nov. 29, 2018, 4 pages.
Great Britain Search Report, Application No. GB 1910781.2, dated Jan. 13, 2020, 4 pages.
International Commission on Non-Ionizing Radiation Protection, "ICNIRP Guidelines for Limiting Exposure to Time-Varying Electric, Magnetic and Electromagnetic Fields (Up to 300 GHZ)," Health Physics, Jan. 1, 1999, vol. 74(4), 38 pages.
International Preliminary Report on Patentability for Application No. PCT/EP2020/065932, mailed on Jul. 7, 2021, 15 pages.
International Search Report and Written Opinion for Application No. PCT/EP2020/065932, mailed on Jul. 14, 2020, 16 pages.
International Search Report and Written Opinion for Application No. PCT/EP2020/085463, mailed on Feb. 24, 2021, 15 pages.
International Search Report and Written Opinion for Application No. PCT/EP2021/078177, mailed on Dec. 23, 2021, 14 pages.
Jang J., et al., "Depth Map Generation using a Single Image Sensor with Phase Masks," 2016, 11 pages.
Koda Y., et al., "Reinforcement Learning Based Predictive Handover for Pedestrian-Aware mmWave Networks," Apr. 2018, IEEE, Research Gate, 7 pages.
Kyocera Corp: "Coverage Configuration Transition Management for ES Coverage Scenario," 3GPP Draft; R3-132298, 3rd Generation Partnership Project (3GPP), Mobile Competence Centre ; 650, Route Des Lucioles; F-06921 Sophia-Antipolis Cedex ; France, vol. RAN WG3, No. San Francisco, CAa, USA; Nov. 11, 2013-Nov. 15, 2013, Nov. 12, 2013, XP050738315, Retrieved from the Internet: URL:http://www.3gpp.org/ftp/Meetings_3GPP_SYNC/RAN/RAN3/Docs/ [retrieved on Nov. 12, 2013], 5 pages.
Liao C-H., et al., "Eavesdropping Prevention for Heterogeneous Internet of Things Systems," 2018 15th IEEE Annual Consumer Communications & Networking Conference (CCNC), 2018, 2 pages.
Nokia, Alcatel-Lucent Shanghai Bell., "Implications of High Frequency Bands on Mobility,"3GPP TSG-RAN WG2 NR Adhoc, Jan. 17, 2017, 4 pages.
Oguma Y., et al., "Performance Modeling of Camera-Assisted Proactive Base Station Selection for Human Blockage Problem in mm Wave Communications," IEEE Wireless Communications and Networking Conference (WCNC 2016)—Track 3—Mobile and Wireless Networks, © 2016, 8 pages.

(56) References Cited

OTHER PUBLICATIONS

Routray S.K., et al., "Quantum Cryptography for IoT: Aperspective," 2017, 4 pages.
Wu Q., et al., "Safeguarding Wireless Network with UAVs: A Physical Layer Security Perspective," Jul. 24, 2019, 15 pages.
Ye D.H., et al., "Deep Learning for Moving Object Detection and Tracking from a Single Camera in Unmanned Aerial Vehicles (UAVs)," IS&T International Symposium on Electronic Imaging, © 2018, 6 pages.
Zhang G., et al., "Securing UAV Communications via Joint Trajectory and Power Control," IEEE Transactions on Wireless Communications, IEEE Services Centre, Piscataway, NJ, US, vol. 18, No. 2, Feb. 1, 2019, XP011710133, ISSN: 1536-1276, DOI:10.1109/TWC.2019.2892461 [retrieved on Feb. 8, 2019], pp. 1376-1389.
Docomo/Telematica Instituut: "Mobility Management Threats in S3-06564," 3GPP Draft; MMTHREATS-LTE_SAE_Security-Rationale, 3rd Generation Partnership Project (3GPP) Mobile Competence Centre; 650, Route Des Lucioles Cedex ; France vol. SA WG3, No. Ashburn; Oct. 24, 2006, Oct. 24, 2006 (Oct. 24, 2006), XP050279150, [retrieved on Oct. 24, 2006], 9 pages.
International Search Report and Written Opinion for Application No. PCT/EP2022/068967, mailed Oct. 21, 2022, 14 pages.
Ismail M S et al: "Forward-Link Frequency Reuse Efficiency of Power Controlled CDMA Cellular System," Personal, Indoor and Mobile Radio Communications, Sep. 27, 1995, vol. 2, pp. 441-445.
Itoh K-I., et al., "Performance of Handoff Algorithm Based on Distance and RSSI Measurements", IEEE Transactions On Vehicular Technology, Nov. 2002, vol. 51, No. 6, pp. 1460-1468.
"CN Office Action for Application No. 202180072977.2, dated Jan. 17, 2024", 11 pgs.
"International Preliminary Report on Patentability for PCT/EP2022/068967, dated Feb. 22, 2024", 7 pgs.
"International Preliminary Report on Patentability received for PCT Patent Application No. PCT/EP2020/085463, mailed on Aug. 18, 2022", 11 pages.
"International Preliminary Report on Patentability received for PCT Patent Application No. PCT/EP2021/078177, mailed Jan. 4, 2023", 15 pages.
"Office Action received for Chinese Patent Application No. 202080053263.2, mailed on Oct. 10, 2023", 7 pages (English Translation Only).
"Written Opinion received for PCT Patent Application No. PCT/EP2021/078177, mailed on Oct. 13, 2022", Oct. 13, 2022, 7 pages.

\* cited by examiner

WIRELESS TELECOMMUNICATIONS NETWORK

PRIORITY CLAIM

The present application is a National Phase entry of PCT Application No. PCT/EP2020/085463, filed Dec. 10, 2020, which claims priority from EP Patent Application No. 20155636.2, filed Feb. 5, 2020, and GB Patent Application No. 2001529.3, filed Feb. 5, 2020, each of which is hereby fully incorporated herein by reference.

TECHNICAL FIELD

The present disclosure relates to a method of reconfiguring a wireless transmitter in a wireless telecommunications network.

BACKGROUND

A wireless access point transmits wireless signals at a particular transmission power level. The transmission power levels are generally adapted to provide a suitable balance between, on the one hand, capacity and range, and on the other hand, causing interference on transmissions from other wireless access points. However, there is a further consideration, which generally applies to large wireless access points such as macro base stations, in that radio frequency exposure levels must be kept below regulatory standards in public areas. These exposure levels may exceed the regulatory standards in a region immediately surrounding the access point's antenna within which public access is excluded (known as an "exclusion zone"), and drop below the standard a particular distance away from the antenna as the signal strength decreases with distance. Network operators must monitor access to this exclusion zone to prevent access by members of the public and to ensure that maintenance staff (for example) do not receive an excessive dose. This is typically done by manual security controls, such as locked doors to rooftop base stations.

SUMMARY

According to a first aspect of the disclosure, there is provided a method of operating a network node in a wireless telecommunications network, wherein the wireless telecommunications network includes a first access point having a transmitter configured to transmit in a first coverage area, the method comprising receiving, from a sensor, data indicating a location of an object within the first coverage area of the first access point's transmitter; determining, from a set of access rights including excluded, differentiated restrictions and no restrictions, that the object has the differentiated restrictions access right; responsive to the determination that the object has the differentiated restrictions access right, classifying, from a set of classes including a first class and a second class, the object in the first class, wherein the first class is associated with a first restriction configuration having a first electro and/or magnetic field exposure threshold and the second class is associated with a second restriction configuration having a second electro and/or magnetic field exposure threshold; responsive to the determination that the object is classified in the first class, determining that the object shall use the first electro and/or magnetic field exposure threshold; determining that a value of electro and/or magnetic field exposure for the object exceeds the first electro and/or magnetic field exposure threshold; and causing an adjustment of the first access point so as to reduce the value of electro and/or magnetic field exposure for the object.

The electro and/or magnetic field exposure threshold may be time dependent. The electro and/or magnetic field exposure threshold may be time dependent when the object is in the first class.

The first class may be an occupational worker and the second class may be a member of the general public.

The sensor may be a camera and the method may further comprise a step of performing a computer vision operation on the data to determine the location of the object. The sensor may be is an Internet of Things (IoT) sensor configured to detect the presence of an object within the first coverage area.

The object may be classified in the first class or second class based on a computer vision operation. The computer vision operation may include one or more of a group comprising: a facial recognition operation, and an optical character recognition operation.

Causing an adjustment of the first access point may include adjusting a transmit power of the first transmitter and/or adjusting a beam angle of the first transmitter.

According to a second aspect of the disclosure, there is provided a computer program comprising instructions which, when the program is executed by a computer, cause the computer to carry out the first aspect of the disclosure. The computer program may be stored on a computer readable carrier medium.

According to a third aspect of the disclosure, there is provided a network node for a wireless telecommunications network comprising a processor configured to carry out the first aspect of the disclosure.

According to a fourth aspect of the disclosure, there is provided a system for a wireless telecommunications network comprising one or more nodes configured to carry out the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
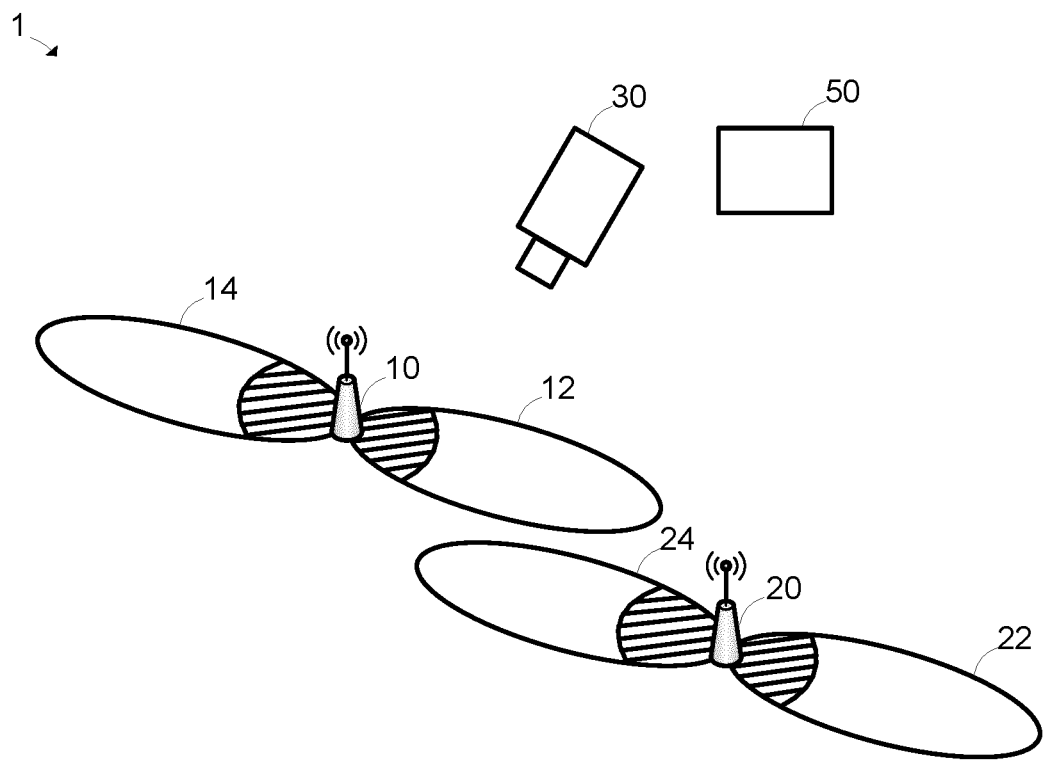
FIG. 1 is a schematic diagram of a wireless telecommunications network of an embodiment of the present disclosure.

A first embodiment of a wireless telecommunications network of the present disclosure will now be described with reference to FIGS. 1 to 3. In this embodiment, the wireless telecommunications network is a cellular telecommunications network 1 including a first base station 10, second base station 20 and a beam management node 50. The first and second base stations 10, 20 are both configured for communications according to a cellular telecommunications protocol, such as the 5$^{th}$ Generation (5G) protocol defined by the 3$^{rd}$ Generation Partnership Project (3GPP), and transmit in one or more frequency ranges which, in this example, are below 6 GHz. The first and second base stations 10, 20 include backhaul connections to a cellular core network (not shown).

As shown in FIG. 1, the first and second base stations 10, 20 each include a plurality of transceivers that are configured for beamforming, so that distinct beams 12, 14, 22, 24 may be formed to provide voice and/or data service to users within the geographical areas defined by each beam. The first and second base stations 10, 20 may create, reconfigure and remove each beam of their respective sets of beams. One operating parameter of each transceiver of the plurality of transceivers for the first and second base station 10, 20 is the transmission power. Generally, increasing the transmission power of a transceiver increases both the capacity and the range of the transmissions. The signal strength of these transmissions decreases with distance from the transceiver (for example, by an inverse square law for propagation in free space or by some other function in a real-world example), and may therefore exceed a regulatory standard in a region immediately surrounding the transceiver (known as an "exclusion zone") and drop below the regulatory standard outside the exclusion zone. An exclusion zone for the first base station 10 (which may be based on a function of the transmission powers of one or more of its respective plurality of transceivers) and an exclusion zone for the second base station 20 (which, again, may be based on a function of the transmission powers of one or more of its respective plurality of transceivers) are shown in FIG. 1 (by hatching).

FIG. 1 further illustrates an optical camera 30. The optical camera 30 is configured to capture images or video (i.e. a sequence of images) in the visible spectrum (that is, electromagnetic radiation having wavelengths in the range of around 400 to 700 nanometers). The optical camera 30 is in a fixed location and is positioned so as to capture images or video of a geographical area that includes the first base station 10.

Figure 2:
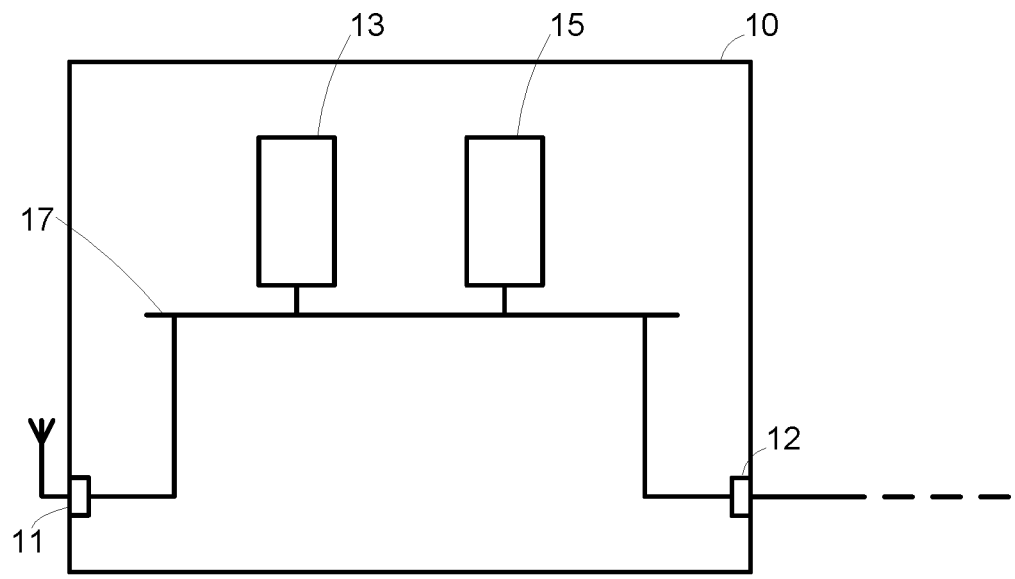
FIG. 2 is a schematic diagram of a first base station of the network of FIG. 1.
Figure 3:
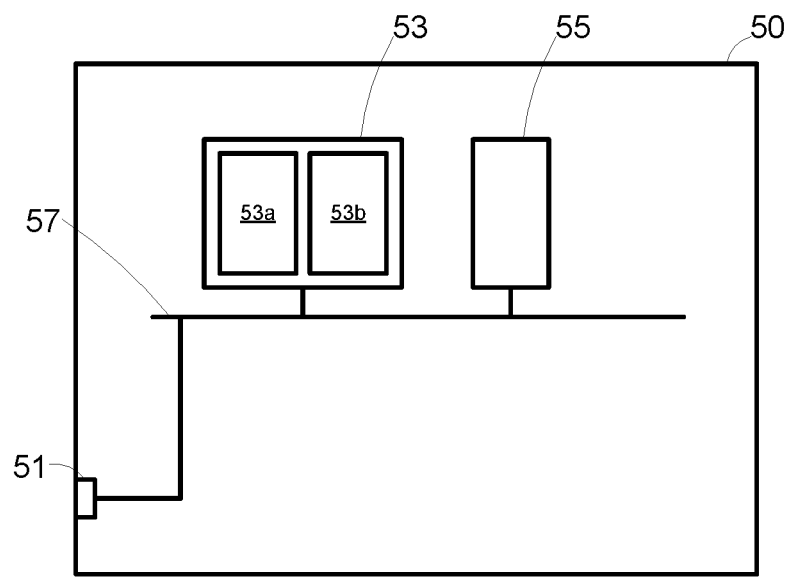
FIG. 3 is a schematic diagram of a beam management node of the network of FIG. 1.

The first base station 10 is shown in more detail in FIG. 2. The first base station includes a first communications interface 11 (connectable to an antenna), a second communications interface 12 (connectable to a core network via a backhaul connection), a processor 13 for processing wireless signals received/transmitted via the first and second communications interfaces, and memory 15, all connected via bus 17. The second base station 20 is substantially the same as the first base station 10.

The cellular telecommunications network 1 further includes a beam management node 50, residing in the core network and connected to both the first and second base stations 10, 20. As shown in more detail in FIG. 3, the beam management node 50 includes a communications interface 51, a processor 53 and memory 55, all connected via bus 57. Memory 55 includes a database of visual training data for a computer vision learning agent. In this embodiment, memory 55 includes a database storing:

1. An identifier for a type of object (e.g. a person, car, cow, etc.); and
2. One or more training images of that type of object (e.g. including a number of variations of that type of object, such as different car models and images at different angles).

The database may be periodically updated with new images.

In this embodiment, the processor 53 of beam management node 50 implements a computer vision process by a learning agent 53a and an inference agent 53b. The learning agent 53a is configured to train a machine learning algorithm, in this case a classification model, based on the visual training data in the database. The classification model maps between each training image from the database and the corresponding identifier for that type of object. The trained classification model may then be used by the inference agent 53b.

The learning agent 53a performs periodic learning operations to update the classification algorithm, thus adapting to any new images of objects. The inference agent 53b uses the trained classification model in order to map between an input image (e.g. an image captured by the optical camera 30) and an object identifier. In response to certain classifications, the beam management node 50 may reconfigure beams of the first and/or second base station 10, 20 (as discussed below in the first and second embodiments of methods of the present disclosure).

Figure 4:
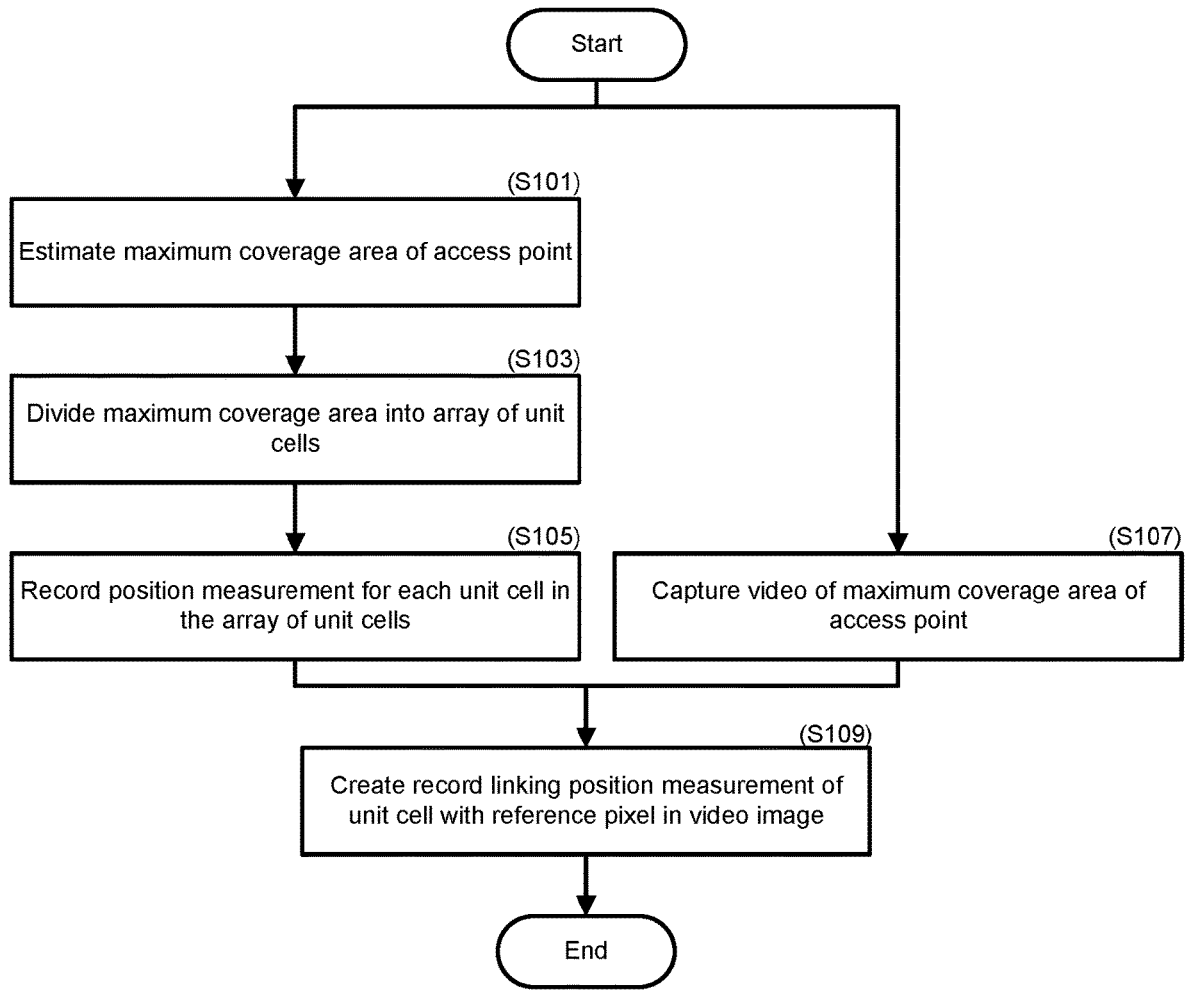
FIG. 4 is a flow diagram illustrating a calibration technique, used in a first and second embodiment of a method of the present disclosure.

Both the first and second embodiments utilize a dataset created by a calibration phase. The calibration phase will now be described with reference to FIG. 4. The calibration phase may be used to correlate one or more pixels of the image from the optical camera 30 with real-world positions. To achieve this, in S101, a maximum coverage area of the first base station 10 is determined based on the theoretical maximum distance of transmissions from the first base station 10. This may be estimated based on path loss models or coverage simulation tools (e.g. Forsk Atoll). In S103, this maximum coverage area is divided into an array of unit cells having a predetermined area (e.g. 4 square meters). In S105, a mobile device having a Global Navigation Satellite System (GNSS) module (such as the widely-used Global Positioning System, GPS) is positioned in a unit cell of this array of unit cells and a position measurement (i.e. GNSS coordinates) is captured and recorded in memory, together with a timestamp indicating the time the position measurement was captured. S105 is then repeated for each unit cell in the array of unit cells, resulting in a GNSS coordinate reading for each unit cell of the array of unit cells.

In S107, which is performed in parallel (i.e. at the same time) to all iterations of S105, a video is captured of the maximum coverage area (e.g. by the optical camera 30). Each constituent image of the video is recorded together with a timestamp indicating the time the image was captured.

In S109, the beam management node 50 receives a first dataset from the mobile device, including the GNSS coordinates of each unit cell of the array of unit cells (together with a timestamp of the GNSS coordinate measurement), and a second dataset from the optical camera 30, including the video (together with a timestamp indicating the time each image in the video was captured). The beam management node 50 then creates a third dataset by processing each record in the first dataset as follows:

1) identify the timestamp associated with the GNSS coordinates for the unit cell;
2) retrieve a record from the second dataset for an image having the same (or closest) timestamp;
3) identify the mobile device in the image and select a reference pixel representing the mobile device's position in the image. The reference pixel may be, for example, the lowermost, center pixel of the mobile device in the image; and
4) create a new data record for the third dataset having a first data field for the GNSS coordinates and a second data field for the reference pixel.

109 is repeated for each record (i.e. each unit cell) in the first dataset, so that the third dataset includes a record for each unit cell linking the GNSS coordinates for that unit cell to a reference pixel in an image captured by the optical camera 30.

The third dataset is stored in the beam management node's memory 55 and may be used in the following first and second embodiments of a method of the present disclosure. The first embodiment will now be described with reference to FIGS. 5 to 8.

Figure 5:
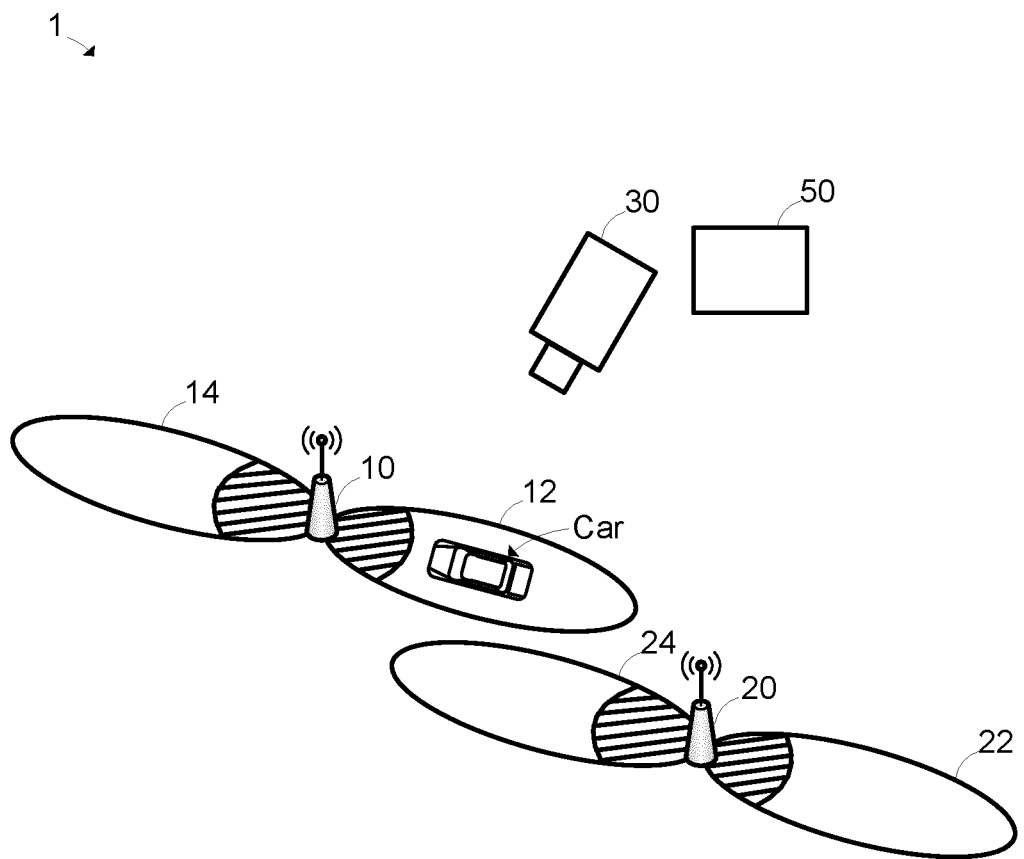
FIG. 5 is a schematic diagram of a wireless telecommunications network implementing the first embodiment of a method of the present disclosure, in a first state.

The cellular telecommunications network is initially in a first state as shown in FIG. 5. FIG. 5 illustrates an object (in this first embodiment, a car) positioned within the coverage area of the first base station 10 but outside the first base station's exclusion zone. The car is associated with a User Equipment (UE), such as an occupant's cellular/mobile phone, which is served by the first base station 10.

In 201 of the first embodiment (as shown in the flow diagram of FIG. 8), the optical camera 30 captures an image of the geographical area. In 203, the optical camera 30 sends this data to the beam management node 50.

On receipt of this data, the beam management node 50 processes the image to detect each object in the image (S205). Upon detection, the beam management node 50 determines the lowermost, center pixel of the detected object, and performs a matching operation on the third dataset to identify the closest reference pixel to the lowermost, center pixel of the detected object. The beam management node 50 then retrieves the GNSS coordinates for this closest reference pixel (S207).

In S209, the beam management node 50 determines the distance and angle between the base station and the detected object based on the retrieved GNSS coordinates and the first base station's GNSS coordinates. In S211, the beam management node 50 determines the strength of the first base station's signal at the detected object based on the first base station's transmission power at the determined angle, the determined distance between the first base station and detected object, and a path loss model. The determined signal strength at the detected object's location is then compared to an exposure rate threshold. The exposure rate threshold represents the maximum instantaneous exposure rate to radio frequencies as defined by regulatory standards (e.g. 0.08 W/kg for frequencies less than 6 GHz or 20 W/m$^2$ for frequencies above 6 GHz) and a reference mass (e.g. 60 kg) or reference frontal surface area (e.g. 1 m$^2$).

In this first iteration, the signal strength is less than the exposure rate threshold and the operation loops back to S201.

Figure 6:
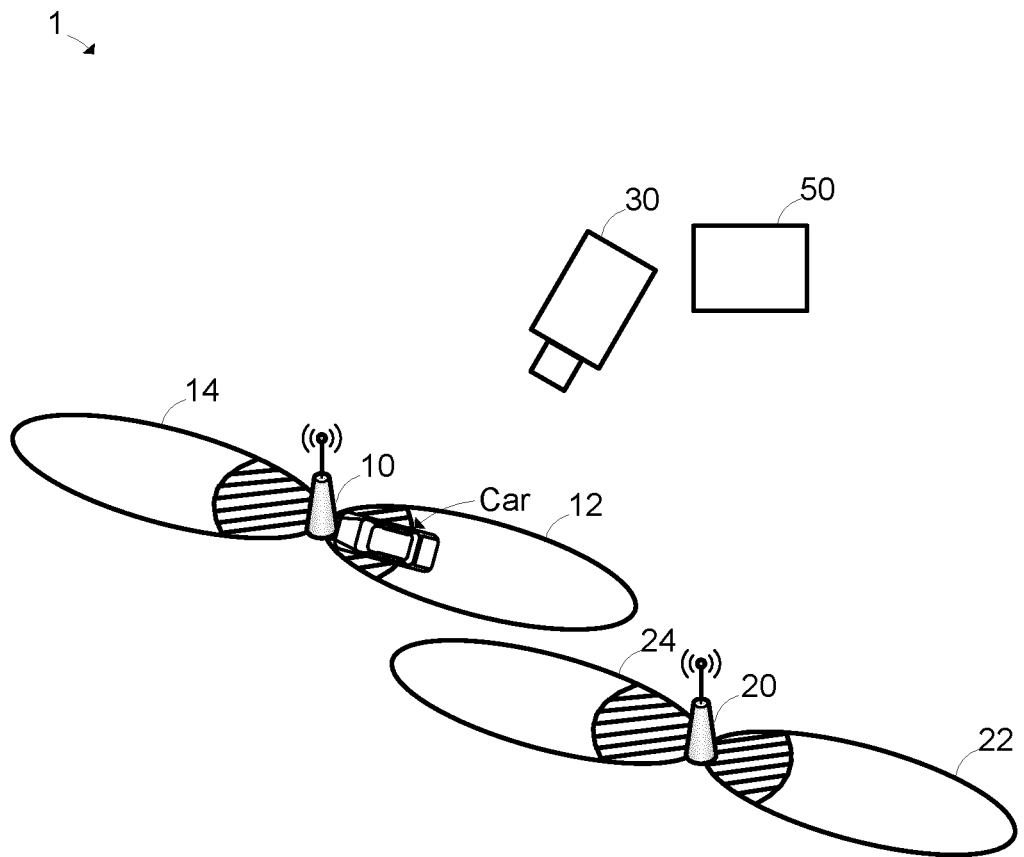
FIG. 6 is a schematic diagram of a wireless telecommunications network implementing the first embodiment of a method of the present disclosure, in second state.

FIG. 6 illustrates the cellular telecommunications network in a second state, in which the car is within the coverage area of the first base station and is also within the first base station's exclusion zone.

In a second iteration of this embodiment, S201 to S209 are performed again so as to capture an image of the geographical area, send the image data to the beam management node 50, process the image to detect each object in the image, retrieve GNSS coordinates for the closest reference pixel corresponding to the lowermost, center pixel of the detected object in the image, and determine the distance and angle between the first base station and the object.

In S211, the beam management node determines the strength of the first base station's signal at the detected object based on the first base station's transmission power at the determined angle, the determined distance between the first base station and the detected object, and a path loss model, and compares this to the exposure threshold. In this second iteration, the determined strength for the car is greater than the exposure threshold and the process continues to S213.

In S213, the beam management node 50 extracts a portion of the image corresponding to the detected object. The extracted image portion of the detected object is then inputted to the inference agent 53b, which uses its trained classification model to output an object type identifier (S215) indicating that the extracted image portion includes a car.

In S217, the beam management node determines the access rights for the identifier (based on a further preconfigured database associating each identifier with their access rights, stored in memory 55). In this embodiment, there are three possible access rights—excluded, differentiated restrictions, and no restrictions. In this second iteration of the first embodiment, the identifier is associated with the excluded access right. In S219, the beam management node 50 responds to this determination by sending instruction messages to both the first and second base stations 10, 20 to reconfigure their beams.

The instruction message to the first base station will now be described. This first instruction message includes an instruction to the first base station 10 to reconfigure so that the signal strength of its transmissions at the location of the detected object are less than the exposure rate threshold, and further includes the determined distance and determined angle between the detected object and the first base station 10.

In S221, upon receipt of this first instruction message, the first base station 10 calculates a transmission power for one or more of its transceivers so that the signal strength at the location of the detected object is less than the exposure threshold at the determined distance and angle. This calculation is based on the exposure rate threshold, the distance between the first base station 10 and the detected object, and the path loss model.

In S223, the first base station 10 reconfigures its transceiver(s) to use the calculated transmission power(s). The signal strength of transmissions from the first base station 10 at the location of the excluded object are now less than the exposure rate threshold.

The second instruction message will now be described. This second instruction message is sent to the second base station 20 and includes an instruction to the second base station 20 to reconfigure so that its transmissions cover the location of the detected object so that the signal strength of its transmissions at the detected object's location is at a target value that is:

1) above a service threshold so that the UE associated with the car may receive voice and/or data services from the second base station, and
2) below the exposure rate threshold, and further includes the GNSS coordinates of the detected object.

In S220, the second base station 20 reacts to this second instruction message by calculating a transmission power for one or more of its transceivers so that its transmissions cover the detected object's location by 1) determining the distance and angle between the second base station and the detected object based on the GNSS coordinates of the detected object and the GNSS coordinates of the second base station 20, and 2) calculating the transmission power for the one or more transceivers based on the target signal strength value, the distance between the second base station and the detected object, and a path loss model. In S222, the second base station 20 reconfigures its transceiver(s) to use the calculated transmission power(s).

Figure 7:
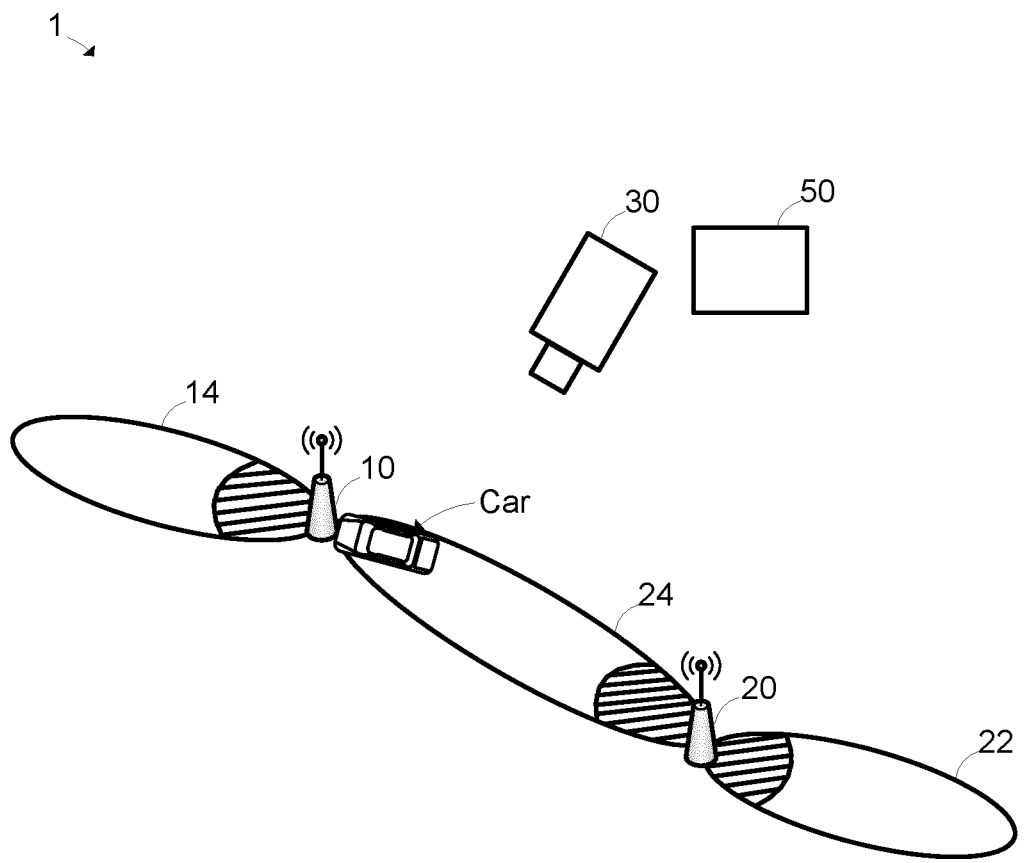
FIG. 7 is a schematic diagram of a wireless telecommunications network implementing the first embodiment of a method of the present disclosure, in a third state.
Figure 8A:
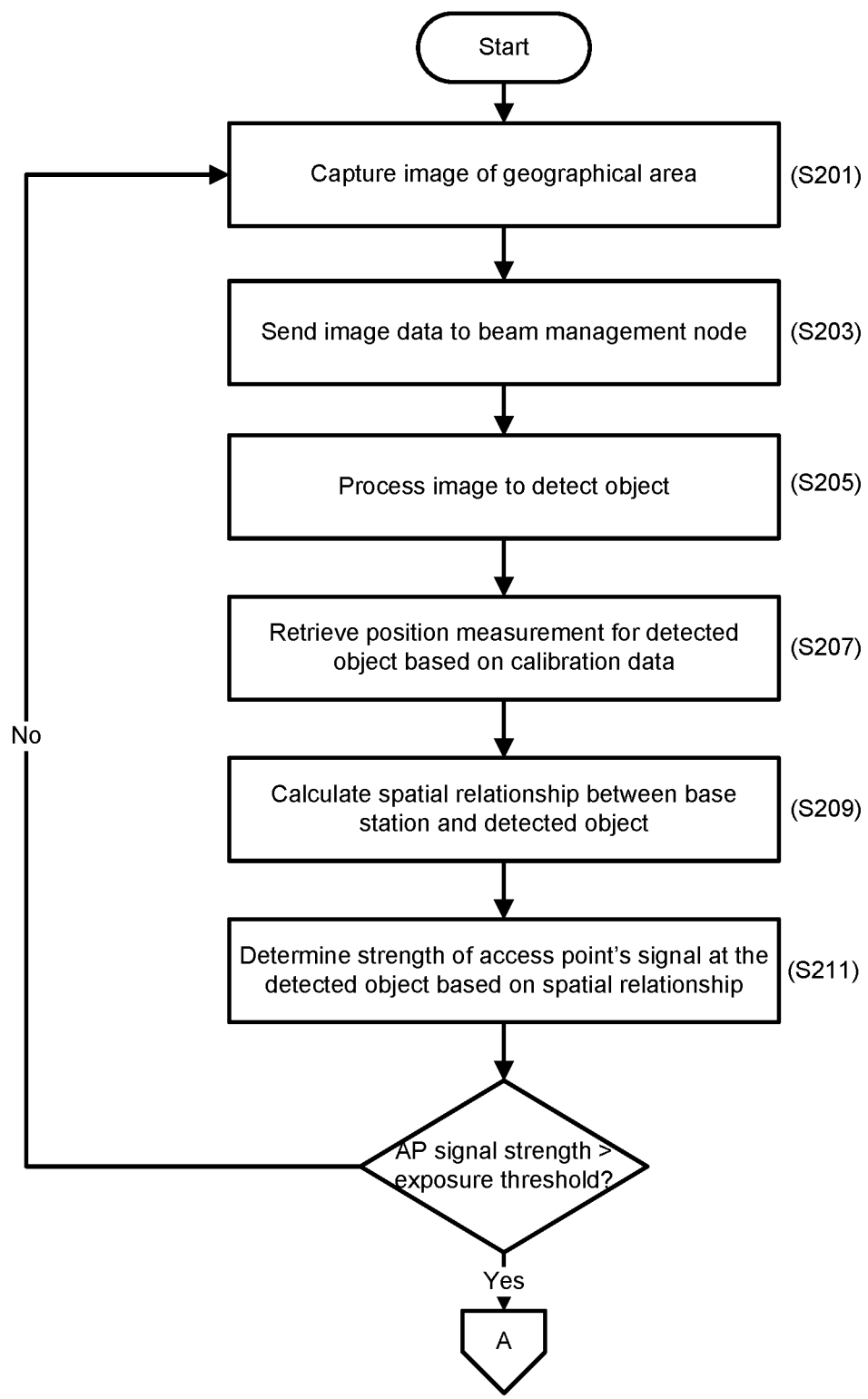
FIGS. 8a and 8b show a flow diagram illustrating the first embodiment of a method of the present disclosure.
Figure 8B:
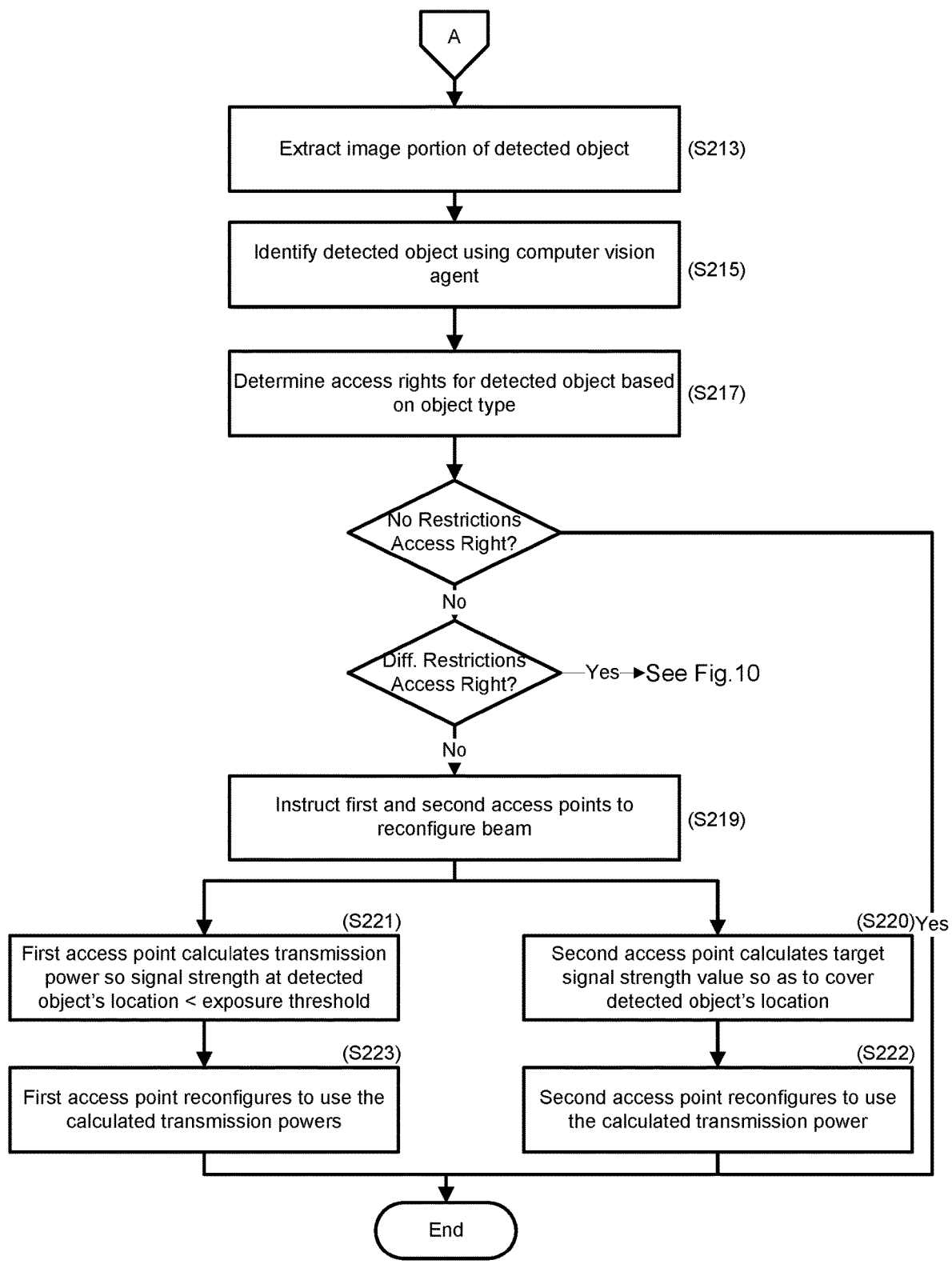

FIG. 7 illustrates the cellular telecommunications network in a third state, in which the first and second base stations have reconfigured so that the signal strength of transmissions of the first base station 10 at the car's location are less than the exposure rate threshold, and so that the strength of the second base station's transmissions at the car's location are above the target signal strength value.

Following S223, the signal strength from the first base station 10 as measured by the UE (associated with the car) is less than a threshold so as to trigger a handover. In response, the first base station 10 hands over the UE to the second base station 20. This is now possible as (following S220 to S222) transmissions from the second base station 20 now cover the car's location. This first embodiment therefore provides the benefit of handing over the UE to an alternative base station following reconfiguration of a serving base station when the UE enters the serving base station's exclusion zone, ensuring continuity of service. In an alternative scenario in which S223 completes before S222 is complete, then the UE may temporarily lose service before connecting to the second base station 20. Nonetheless, this first embodiment provides the benefit that this period of loss of service is minimized.

Figure 9:
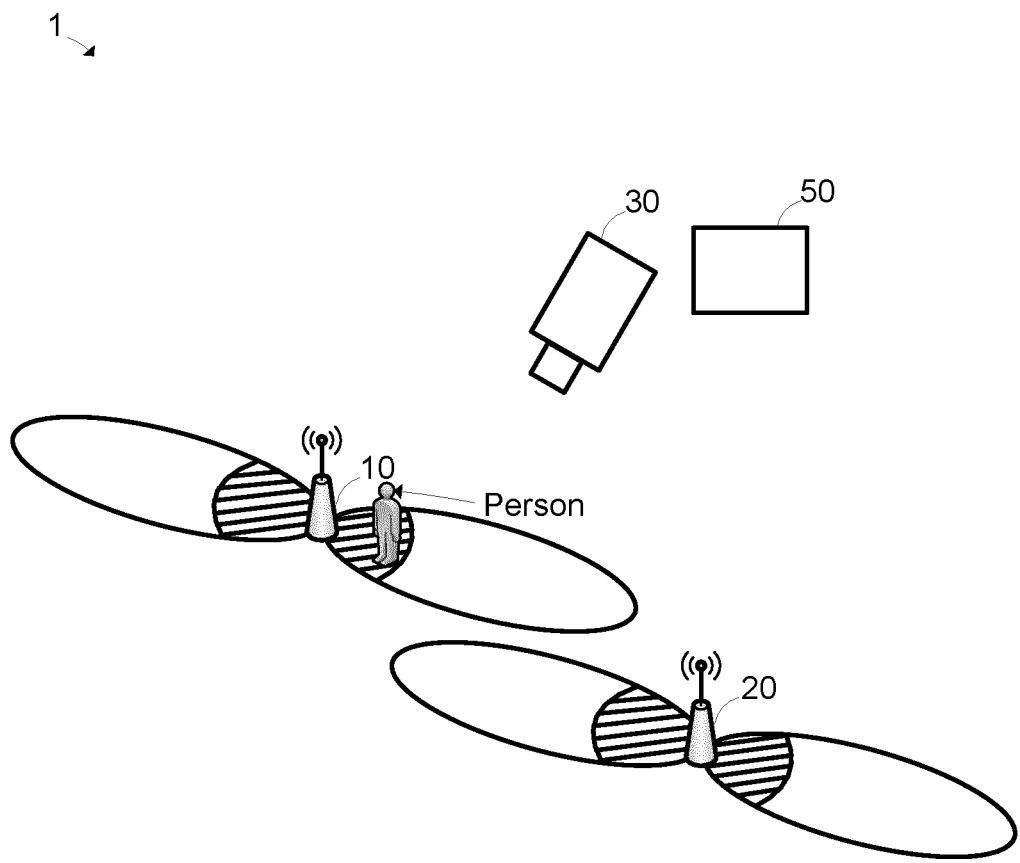
FIG. 9 is a schematic diagram of a wireless telecommunications network implementing the second embodiment of a method of the present disclosure.
Figure 10A:
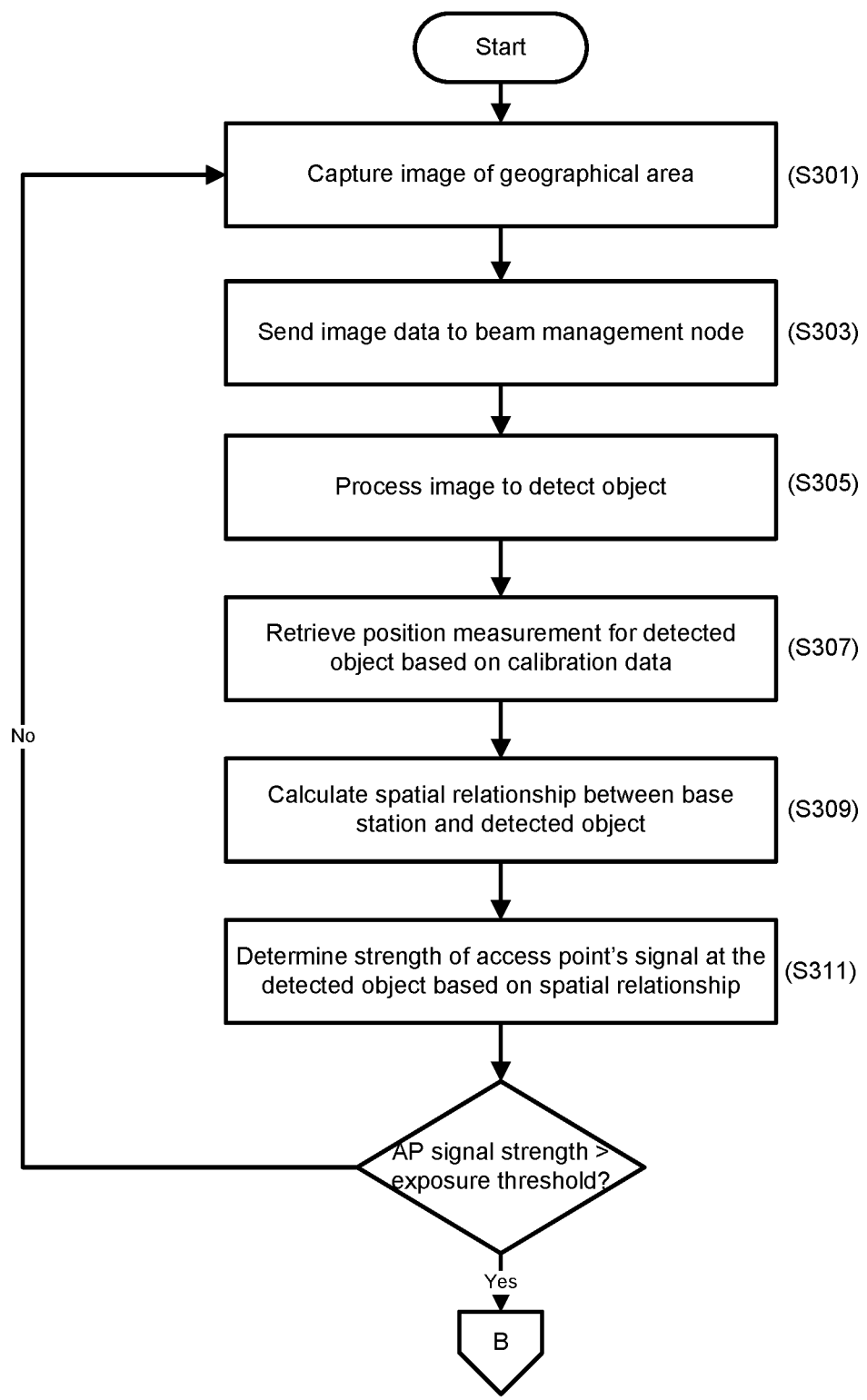
FIGS. 10a and 10b show a flow diagram illustrating the second embodiment of a method of the present disclosure.
Figure 10B:
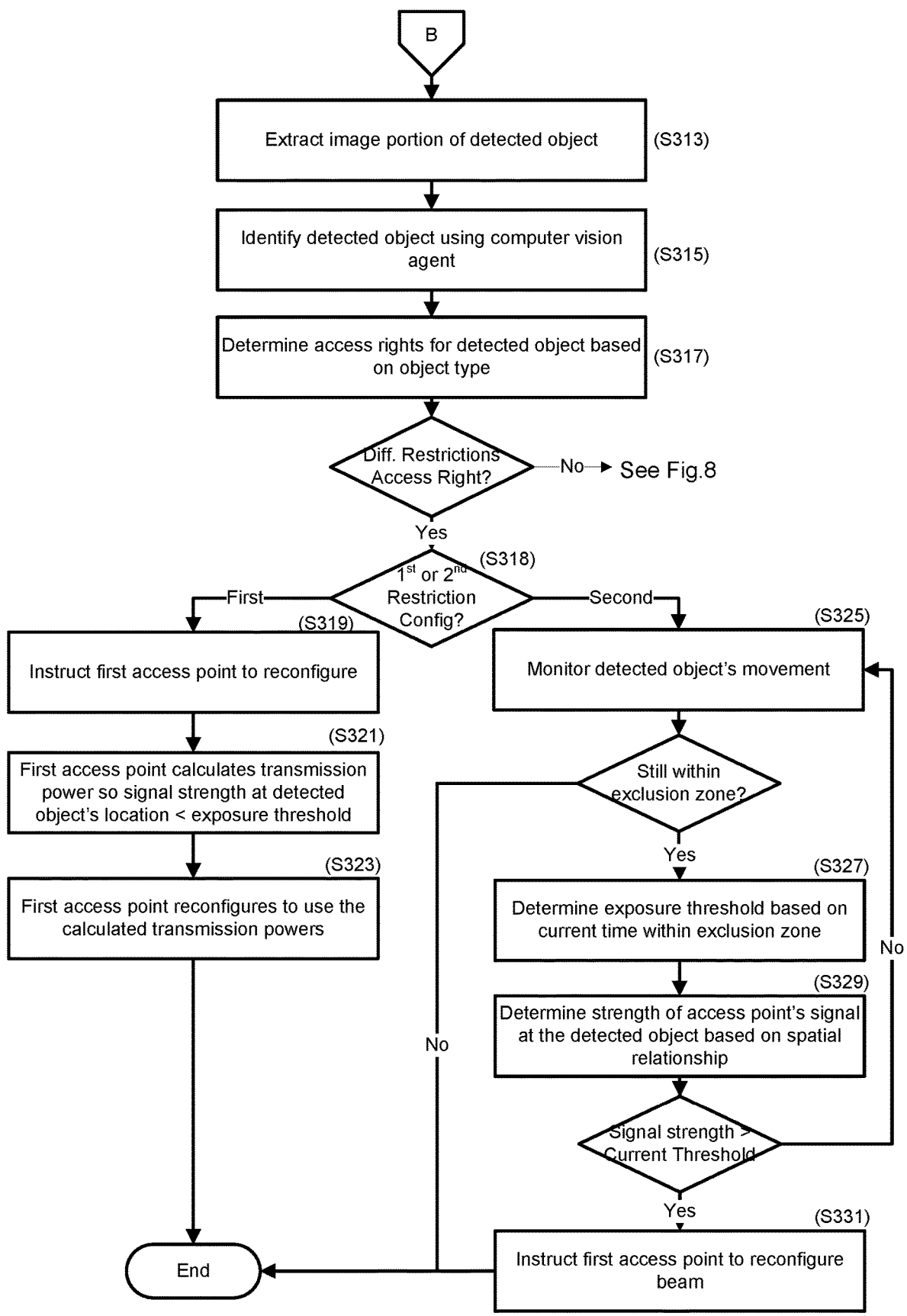

A second embodiment of a method of the present disclosure will now be described with reference to FIGS. 9 to 10. FIG. 9 illustrates the cellular telecommunications network in a first state, in which a person is located within the first base station's coverage area and is also inside the first base station's exclusion zone. As shown in the flow diagram of FIGS. 10a and 10b, S301 to S311 (corresponding to S201 to S211 of the first embodiment above) are performed so as to capture an image of the geographical area, send the image data to the beam management node 50, process the image to detect each object in the image, retrieve GNSS coordinates for the closest reference pixel corresponding to the lowermost, center pixel of the detected object, determine the distance and angle between the first base station and the detected object, and determine the strength of the first base station's signal at the detected object based on the first base station's transmission power at the determined angle and based on the determined distance between the first base station and detected object. In this second embodiment, the determined signal strength of transmissions at the detected object's location is greater than the exposure rate threshold and the process continues to S313.

In S313, the beam management node extracts a portion of the image corresponding to the detected object. The extracted image portion of the detected object is then inputted to the inference agent 53b, which uses its trained classification model to output an identifier (S315) indicating that the extracted image portion includes a person. In S317, the beam management node determines the access rights for the identifier. In this embodiment, the identifier is associated with the differentiated restrictions access right, so the process continues to S318, in which it is determined whether the person is a member of the general public (and so should use a first restriction configuration) or an occupational worker (and so should use a second restriction configuration). This determination may be based on, for example, a facial recognition process to positively identify the person against a database of known workers, or alternatively on an optical character recognition process to identify a company name or logo on the person's clothing or a vehicle's bodywork. In this example, the first restriction configuration is to immediately reconfigure transmissions to below a first exposure rate threshold, whilst the second restriction configuration is to monitor the detected object over a period of time and determine whether its exposure satisfies a second exposure threshold.

An example of each restriction configuration will now be described. In a first example, the person is identified as a member of the general public and the first restriction configuration is used. In S319, the beam management node 50 sends a third instruction message to the first base station 10. This third instruction message includes an instruction to the first base station 10 to reconfigure so that the signal strength of its transmissions at the location of the detected object are less than the first exposure rate threshold, and further includes the determined distance and determined angle between the detected object and the first base station 10. In S321, upon receipt of this third instruction message, the first base station 10 calculates a transmission power for one or more of its transceivers so that the signal strength at the location of the detected object is less than the first exposure rate threshold at the determined distance and angle. This calculation is based on the first exposure rate threshold, the distance between the first base station 10 and the detected object, and the path loss model. In S323, the first base station 10 reconfigures its transceiver(s) to use the calculated transmission power(s). The signal strength of transmissions from the first base station 10 at the location of the excluded object are now less than the first exposure rate threshold.

In a second example, the person is positively identified as an occupational worker and the second restriction configuration is used. In S325, the beam management node 50 begins a monitoring operation on the detected object so as to monitor the detected object's movement. If the detected object has moved out of the exclusion zone, then the process ends. If the detected object is still within the exclusion zone, the beam management node 50 records a time value representing the total time the detected object has been within the exclusion zone. In S327, the beam management node 50 identifies a second exposure rate threshold (representing a maximum instantaneous exposure rate for the detected object) based on the current time value, selected from a plurality of exposure rate thresholds for a plurality of time ranges, e.g.:

| Time in Exclusion Zone (mm) | Exposure Threshold (W/kg) |
| --- | --- |
| 0-2 | 1.2 |
| 2-4 | 0.6 |
| 4-6 | 0.4 |
| ... | ... |

In S329, the beam management node 50 calculates the signal strength of transmissions from the first base station 10 at the detected object's current location, and compares this to the current second exposure rate threshold. If the signal strength is below the relevant threshold, then the process loops back to S325 and the monitoring continues (and a new second exposure threshold may be selected if the time spent in the exclusion zone enters a new time range). If the signal strength is above the relevant threshold, then (in S331), the beam management node sends a fourth instruction message to the first base station 10 instructing it to reconfigure so that the signal strength of its transmissions at the location of the detected object are less than the second exposure rate threshold (which may be carried out in the same manner as the first example above).

The second embodiment therefore provides a benefit of a differentiated response following detection of a person in the exclusion zone based on their classification as a worker or a member of the general public. As workers may be considered to understand the risks of radio frequency exposure, and take mitigating actions, then the signal strength does not need to be immediately reduced. This response may therefore maintain a larger coverage area outside the exclusion zone (compared to the coverage area if the signal strength was reduced down to the first exclusion rate threshold), so that any UEs within this coverage area may continue to receive voice and/or data services.

The skilled person will understand that there are other ways to implement a second restriction configuration by monitoring exposure over time. In a further example, the beam management node 50 determines a cumulative exposure for the detected object by monitoring the object's location over a period of time and integrating a series of instantaneous exposure rate measurements over the period of time. This may then be compared to a cumulative exposure threshold. This cumulative exposure may be stored in memory if the object leaves the exclusion zone, which may then be used as a starting value should the object be re-detected in the exclusion zone. In another example, the beam management node 50 determines the detected object's instantaneous exposure rate, determines a corresponding category for this instantaneous exposure rate (e.g. high/medium/low) to identify a time period threshold (representing the maximum time the detected object may spend in this category), and determine whether or not the detected object's elapsed time in the exclusion zone surpasses the time period threshold.

In another example, the beam management node 50 may be configured to both identify the person as an occupational worker (e.g. based on face recognition) and determine the work being performed. This work may be associated with a time period (e.g. 30 minutes), and the beam management node 50 may then reconfigure the first base station 10 so that the instantaneous exposure rate and/or cumulative exposure does not exceed a particular threshold over that time period.

In the second embodiment, the beam management node 50 detects the object as it enters the exclusion zone (i.e. following detection that the signal strength of transmissions from the first base station 10 go above the exposure threshold). To avoid situations in which the beam management node 50 only begins monitoring the object once it has already been in the exclusion zone for some time, then the beam management node 50 may optionally determine whether the detected object has just entered the exclusion zone. If this cannot be verified, then the process defaults to the first restriction configuration. This determination may be based on a threshold distance between the detected object's location and a calculated boundary of the exclusion zone.

The skilled person will understand that other differentiated responses may be used. For example, the first and second restriction configurations may be based on different exposure rate thresholds, so that the transmission power is reduced by a smaller amount for occupational workers than for members of the general public.

In the first embodiment, the second beam of the second base station is reconfigured so as to provide coverage and service to a UE associated with the detected object in the first base station's exclusion zone. In an enhancement, the second beam may be configured to also provide coverage and service to other UEs in the first base station's original coverage area (such as those outside the exclusion zone). This may be achieved by providing a single beam with suitable coverage, or multiple beams to provide suitable overall coverage.

Furthermore, in the above first and second embodiments, the signal strength at the location of the detected object is determined based on a path loss model. However, other methods may be used, such as by comparison of the location with a simulated coverage map.

In the above first and second embodiments, the first beam of the first base station is reconfigured so that the signal strength at the detected object's location is below the exposure rate threshold by reducing its transmission power. However, this is non-essential. In alternative implementations, the beam angle may be modified so that the signal strength at the detected objection's location is below the exposure rate threshold. Furthermore, in the first embodiment, it is non-essential that an existing beam is reconfigured so as to cover the detected object's location. Instead, a new beam may be configured to cover that location.

In the above first and second embodiments, the object identifier may be associated with the no restrictions access right. An example object that may use this access right is an unmanned vehicle. If an object is matched with an identifier having the no restrictions access right, then the process may end so that no action is taken. The skilled person will also understand that it is non-essential that an optical camera and a computer vision process is used to detect the presence of an object in the exclusion zone. Alternatively, one or more connected sensors (i.e. Internet of Things (IoT) sensors) may be used. For example, in a scenario of a rooftop antenna in which the whole rooftop area is an exclusion zone, a door sensor may be used to identify whether a person is entering or leaving the exclusion zone. The IoT sensor(s) may be part of the base station, or may be connected with other systems in the geographical area. Furthermore, an access token system may be used to determine whether the person uses a first restriction configuration or a second restriction configuration. The IoT sensor may therefore be a sensor for detecting a presence of an object (either through direct sensing or by implication) within the exclusion zone.

The skilled person will also understand that it is non-essential that the present disclosure is performed by a beam management node in the core network. The method may be performed by any node (or a group of cooperating nodes)

anywhere in the network, with suitable communications interfaces for transmitting and receiving data. Furthermore, the implementation of the present disclosure in a cellular telecommunications network is just one example, and may instead be implemented in any form of wireless telecommunications network having a wireless access point, such as a wireless local area network, wireless wide area network, wireless ad hoc network, or wireless personal area network.

In the first embodiment, the exposure threshold may be based on the object type, so that a different threshold may be used depending on the type of object. The beam management node may therefore include a further database of thresholds for different object types. This database may be updateable. Furthermore, the reference mass/frontal surface area used above are merely examples, and different values may be used (which may also be dependent on the detected object type).

In the above embodiments, the object's location is based on a comparison of a reference pixel to the third dataset. This reference pixel may be any pixel for the object, but it is preferable in some embodiments that the same point of the object (e.g. lowermost-center in the above embodiments) is used for both the generation of the third dataset and in the operational phase of the first and second embodiment.

Figure 11:
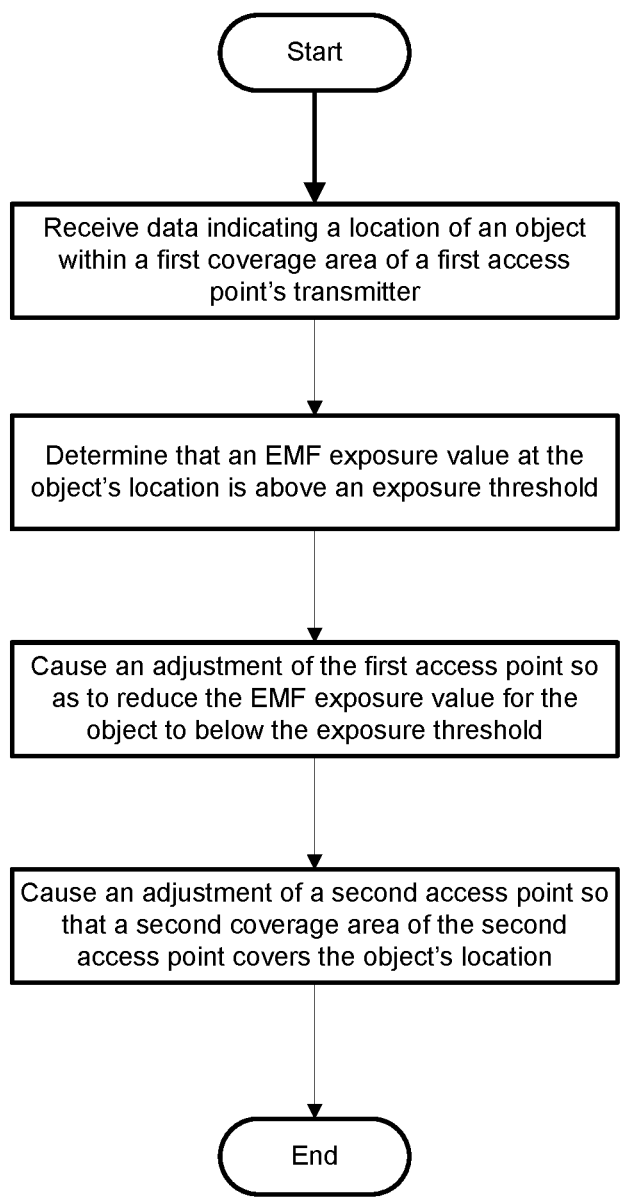
FIG. 11 is a flow diagram of the first embodiment of the present disclosure.

A flowchart representing the first embodiment of the present disclosure is shown in FIG. 11. In the first embodiment, data is received indicating a location of an object within a first coverage area of a first access point's transmitter. This data may be received from a camera (e.g. an optical camera) or another form of sensor, such as an IoT sensor. The data is then analyzed to determine that an EMF exposure value at the object's location is above an exposure threshold. These exposure thresholds may be based on the type of object (so that different thresholds may be used for different types of object). Following this determination, there is an adjustment of both the first access point so as to reduce the EMF exposure value for the object to below the exposure threshold and an adjustment of a second access point so that a coverage area of the second access point covers the object's location (and, optionally, to cover one or more other UEs within the first coverage area). In doing so, the second access point may provide coverage to a UE associated with the object, ensuring continuity of service.

Figure 12:
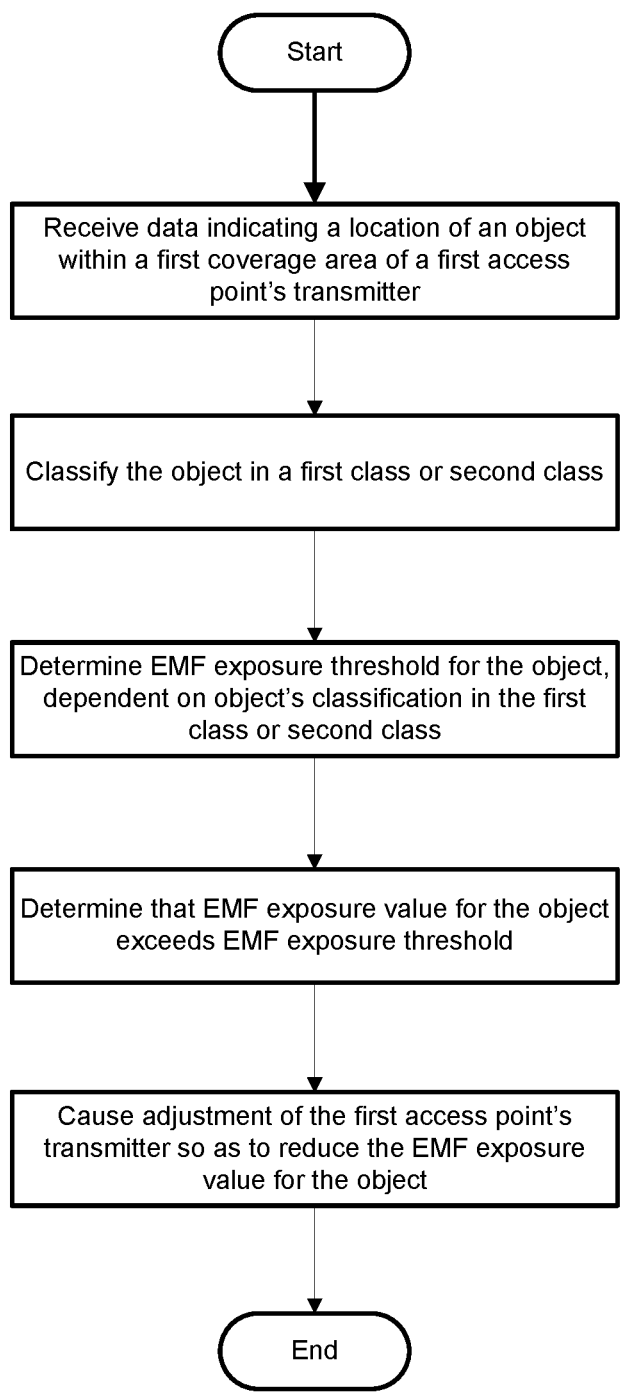
FIG. 12 is a flow diagram of the second embodiment of the present disclosure.

A flowchart representing the second embodiment of the present disclosure is shown in FIG. 12. In the second embodiment, data is received indicating a location of an object within a first coverage area of a first access point's transmitter. Again, this data may be received from a camera (e.g. an optical camera) or another form of sensor, such as an IoT sensor. The object is then analyzed to classify it in a first class or second class. An EMF exposure threshold is then determined for the object, which is dependent on the object's classification in the first class or second class. It is then determined that the EMF exposure threshold for the object exceeds an EMF exposure threshold, and there is an adjustment of the first access point so as to reduce the EMF exposure value for the object. In doing so, there may be different EMF exposure thresholds for different types of object (e.g. worker or general public) enabling a differentiated response. For example, the first and second classes of object may use different values of EMF exposure threshold, one EMF exposure threshold may be time dependent and the other EMF exposure threshold may not be time dependent, or both EMF exposure thresholds may be time dependent but with different time values.

The invention claimed is:

1. A method of operating a network node in a wireless telecommunications network, wherein the wireless telecommunications network includes a first access point having a transmitter configured to transmit in a first coverage area, the method comprising:
   receiving, from a sensor, data indicating a location of an object within the first coverage area of the transmitter of the first access point;
   determining, from a set of access rights including excluded, differentiated restrictions and no restrictions, that the object has the differentiated restrictions access right;
   responsive to the determination that the object has the differentiated restrictions access right, classifying, from a set of classes including a first class and a second class, the object in the first class, wherein the first class is associated with a first restriction configuration having a first electro or magnetic field exposure threshold and the second class is associated with a second restriction configuration having a second electro or magnetic field exposure threshold;
   responsive to the determination that the object is classified in the first class, determining that the object shall use the first electro or magnetic field exposure threshold;
   determining that a value of electro or magnetic field exposure for the object exceeds the first electro or magnetic field exposure threshold; and
   causing an adjustment of the first access point so as to reduce the value of electro or magnetic field exposure for the object.

2. The method as claimed in claim 1, wherein the first electro or magnetic field exposure threshold is time dependent.

3. The method as claimed in claim 1, wherein the first class is an occupational worker and the second class is a member of the general public.

4. The method as claimed in claim 1, wherein the sensor is a camera and the method further comprises performing a computer vision operation on the data to determine the location of the object.

5. The method as claimed in claim 1, wherein the sensor is an Internet of Things (IoT) sensor configured to detect a presence of the object within the first coverage area.

6. The method as claimed in claim 1, wherein the object is classified in the first class based on a computer vision operation.

7. The method as claimed in claim 6, wherein the computer vision operation includes one or more of a facial recognition operation, and an optical character recognition operation.

8. The method as claimed in claim 1, wherein causing an adjustment of the first access point includes at least one of adjusting a transmit power of the first transmitter or adjusting a beam angle of the first transmitter.

9. A network node for a wireless telecommunications network comprising a processor configured to carry out the method of claim 1.

10. A system for a wireless telecommunications network comprising one or more nodes configured to carry out the method of claim 1.

11. A non-transitory computer-readable storage medium storing a computer program comprising instructions which, when the computer program is executed by a computer, cause the computer to carry out the method of claim 1.

12. A system comprising at least one processor and memory configured to carry out the method of claim 1.

\* \* \* \* \*